US010165309B2

(12) United States Patent
Lin

(10) Patent No.: US 10,165,309 B2
(45) Date of Patent: *Dec. 25, 2018

(54) METHOD AND APPARATUS FOR LIVE BROADCAST OF STREAMING MEDIA

(71) Applicant: Tencent Technology (Shenzhen) Company Limited, Shenzhen (CN)

(72) Inventor: Sen Lin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,892

(22) Filed: Feb. 22, 2018

(65) Prior Publication Data
US 2018/0184139 A1 Jun. 28, 2018

Related U.S. Application Data

(63) Continuation of application No. 15/176,041, filed on Jun. 7, 2016, now Pat. No. 9,942,579, which is a
(Continued)

(30) Foreign Application Priority Data

Jun. 19, 2014 (CN) .......................... 2014 1 0276204

(51) Int. Cl.
*H04N 21/234* (2011.01)
*H04N 21/242* (2011.01)
*H04N 21/2187* (2011.01)

(52) U.S. Cl.
CPC ... *H04N 21/23424* (2013.01); *H04N 21/2187* (2013.01); *H04N 21/234* (2013.01); *H04N 21/23406* (2013.01); *H04N 21/242* (2013.01)

(58) Field of Classification Search
CPC combination set(s) only.
See application file for complete search history.

(56) References Cited

U.S. PATENT DOCUMENTS 8,331,772 B1 12/2012 Zdepski
2006/0041908 A1* 2/2006 Kim .................. G06F 17/30852
725/52
(Continued)

FOREIGN PATENT DOCUMENTS

CN   101345882 A   1/2009
CN   101485124 A   7/2009
(Continued)

OTHER PUBLICATIONS

Tencent Technology, ISRWO, PCT/CN2015/081946, Sep. 30, 2015, 7 pgs.
(Continued)

*Primary Examiner* — Alexander Gee
(74) *Attorney, Agent, or Firm* — Morgan, Lewis & Bockius LLP

(57) ABSTRACT

The present disclosure relates to the field of communications, and discloses a method and an apparatus for interrupting and resuming live broadcast of streaming media. The method includes: buffering, in real time, streaming media data during live broadcast of streaming media; interrupting the live broadcast when a broadcast insertion command is received; playing broadcast insertion information associated with the broadcast insertion command and then playing the buffered streaming media data at a specified speed from a start moment a buffer play start moment for playing the buffered streaming media data, the specified speed being higher than a live broadcast speed of the streaming media, until a playback process of the buffered streaming media data is synchronized with the live broadcast of the streaming
(Continued)

media so as to stop the playback process of the buffered streaming media data, and resuming the live broadcast.

18 Claims, 5 Drawing Sheets

Related U.S. Application Data continuation of application No. PCT/CN2015/081946, filed on Jun. 19, 2015.

(56) References Cited

U.S. PATENT DOCUMENTS

| 2007/0003215 A1 | 1/2007 | Ito et al. |
| 2008/0022007 A1 | 1/2008 | Hostyn et al. |
| 2008/0304809 A1 | 12/2008 | Haberman |
| 2010/0189412 A1* | 7/2010 | Chang .................. G11B 27/005 386/343 |
| 2011/0267419 A1* | 11/2011 | Quinn ...................... H04N 7/15 348/14.08 |
| 2012/0102517 A1* | 4/2012 | Yang .................. H04N 21/2365 725/17 |
| 2013/0054825 A1 | 2/2013 | Mareachen et al. |
| 2013/0071095 A1 | 3/2013 | Chauvier et al. |
| 2014/0150042 A1* | 5/2014 | Pacor ............... H04N 21/21805 725/116 |
| 2015/0113560 A1* | 4/2015 | McCoy ................ H04N 21/812 725/32 |

FOREIGN PATENT DOCUMENTS

| CN | 102421034 A | 4/2012 |
| CN | 104065982 A | 9/2014 |

OTHER PUBLICATIONS

Tencent Technology, IPRP, PCT/CN2015/081946, Dec. 20, 2016, 5 pgs.

\* cited by examiner

METHOD AND APPARATUS FOR LIVE BROADCAST OF STREAMING MEDIA

RELATED APPLICATIONS

This application is a continuation application of U.S. patent application Ser. No. 15/176,041, entitled "METHOD AND APPARATUS FOR LIVE BROADCAST OF STREAMING MEDIA", filed Jun. 7, 2016, which is a continuation application of PCT Patent Application No. PCT/CN2015/081946, entitled "METHOD AND APPARATUS FOR LIVE BROADCAST OF STREAMING MEDIA" filed on Jun. 19, 2015, which claims priority to Chinese Patent Application No. 201410276204.8, "METHOD AND APPARATUS FOR LIVE BROADCAST OF STREAMING MEDIA," filed on Jun. 19, 2014, all of which are hereby incorporated by reference in their entirety.

FIELD OF THE TECHNOLOGY

The present disclosure relates to the field of communications, and in particular, to a method and an apparatus for live broadcast of streaming media.

BACKGROUND OF THE DISCLOSURE

Currently, a live broadcast system mainly inserts important information in the following manners:

For a system, typically represented by a live sports television, after highlights occur, during an intermission of a game or when the onsite atmosphere is relatively not tense, a real-time signal of current live broadcast is switched to replaying or slow playback of the highlights, and after being played, the highlights are switched to the real-time signal for playback.

For a system, typically represented by an automotive navigation, during playback of a radio, if prompt of the navigation occurs, output of a radio is directly interrupted to play audio prompt of the navigation, and the output of the radio is resumed after the audio prompt is played.

The foregoing manners in which live broadcast systems perform broadcast insertion inevitably cause consequences as follows: Live broadcast information is lost within a broadcast insertion time, a live broadcast effect is affected, and user experience is not friendly enough.

SUMMARY

In view of this, embodiments of the present invention provide a method and an apparatus for live broadcast of streaming media, so as to avoid a loss of live broadcast information due to broadcast insertion, thereby improving a live broadcast effect. The technical solutions are as follows:

According to one aspect, a method for live broadcast of streaming media is provided, including:

buffering, in real time, streaming media data during live broadcast of streaming media;

interrupting the live broadcast when a broadcast insertion command is received, to perform broadcast insertion until the broadcast insertion ends, and determining, according to the broadcast insertion command, a start moment for playing the buffering; and playing the buffered streaming media data at a specified speed from the start moment, until a playback process is synchronized with a real-time signal of the live broadcast, stopping playback of the buffered streaming media data, and resuming the live broadcast, the specified speed being higher than a live broadcast speed of the streaming media.

According to another aspect, an apparatus for live broadcast of streaming media is provided, including:

a buffer module, configured to buffer, in real time, streaming media data during live broadcast of streaming media;

a broadcast insertion module, configured to interrupt the live broadcast when a broadcast insertion command is received, to perform broadcast insertion until the broadcast insertion ends, and determine, according to the broadcast insertion command, a start moment for playing the buffering; and a variable-speed playback module, configured to play the buffered streaming media data at a specified speed from the start moment, until a playback process is synchronized with a real-time signal of the live broadcast, stop playback of the buffered streaming media data, and resume the live broadcast, the specified speed being higher than a live broadcast speed of the streaming media.

The technical solutions provided by the embodiments of the present invention have the following beneficial effects that: streaming media data is buffered in real time during live broadcast of streaming media; the live broadcast is interrupted when a broadcast insertion command is received, to perform broadcast insertion until the broadcast insertion ends, and a start moment for playing the buffering is determined according to the broadcast insertion command; and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the embodiments of the present invention in detail with reference to the accompanying drawings.

Figure 1:
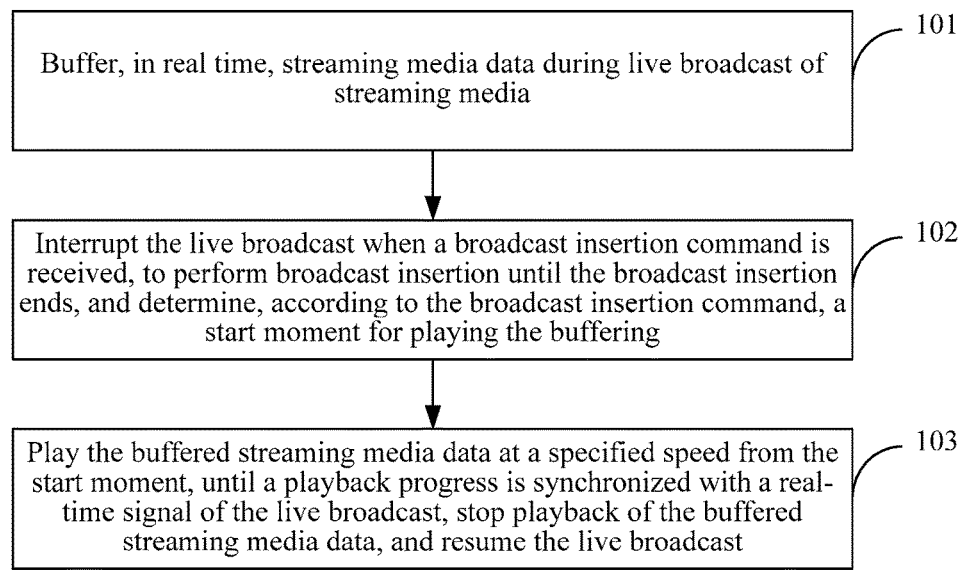
FIG. 1 is a flowchart of a method for live broadcast of streaming media according to an embodiment of the present invention.

Referring to FIG. 1, an embodiment of the present invention provides a method for live broadcast of streaming media, including:

101: Buffer, in real time, streaming media data during live broadcast of streaming media.

In this embodiment, the streaming media data includes but is not limited to: a video file or an audio file. The real-time buffering may be buffered in a local device, or may be buffered in a remote server, which is not specifically limited in this embodiment.

Buffering duration may be set according to the size of system space, or may be set according to a requirement of a user. Preferably, the real-time buffering is buffered in a server, and buffering duration is set as entire duration of the live broadcast of the streaming media data. For example, the streaming media data is a live broadcast television program, whose entire duration is 2 hours, and then the buffering duration is set to be 2 hours.

102: Interrupt the live broadcast when a broadcast insertion command is received, to perform broadcast insertion until the broadcast insertion ends, and determine, according to the broadcast insertion command, a start moment for playing the buffering.

The broadcast insertion command is used to instruct the local device to insert broadcast insertion information during the live broadcast, where the broadcast insertion information may be content, which is played in the live broadcast, of the streaming media, or may be other information except the streaming media, which is not specifically limited in this embodiment.

103: Play the buffered streaming media data at a specified speed from the start moment, until a playback process is synchronized with a real-time signal of the live broadcast, stop playback of the buffered streaming media data, and resume the live broadcast.

The specified speed is higher than a live broadcast speed of the streaming media. In this manner, the buffered streaming media data is played at a speed higher than the live broadcast speed, so that a progress of playing the buffering can catch up with a progress of the live broadcast, thereby ensuring that content of the live broadcast is not lost.

In this embodiment, optionally, the interrupting the live broadcast when a broadcast insertion command is received, to perform broadcast insertion until the broadcast insertion ends, and determining, according to the broadcast insertion command, a start moment for playing the buffering may include:

interrupting the live broadcast when a broadcast insertion command for playing broadcast insertion information except the streaming media data is received, and inserting the broadcast insertion information until the broadcast insertion ends; and determining, according to the broadcast insertion command, that a moment at which the live broadcast is interrupted is the start moment for playing the buffering.

In this embodiment, optionally, the interrupting the live broadcast when a broadcast insertion command is received, to perform broadcast insertion until the broadcast insertion ends, and determining, according to the broadcast insertion command, a start moment for playing the buffering may include:

interrupting the live broadcast when a broadcast insertion command for replaying the streaming media data from a specified moment is received, and playing the buffered streaming media data from the specified moment until the replaying ends; and determining that a moment at which the replaying ends is the start moment for playing the buffering.

In this embodiment, further, the playing the buffered streaming media data from the specified moment until the replaying ends may include:

playing, at a speed that is the same as or is lower than a speed of the live broadcast, the buffered streaming media data from the specified moment until the replaying ends.

In this embodiment, optionally, the foregoing method may further include:

calculating, according to the start moment for playing the buffering and a current moment, a delay time for playing the buffering; and determining a corresponding variable speed multiplier according to the delay time, and obtaining the specified speed through calculation according to the variable speed multiplier and the live broadcast speed.

In the foregoing method provided by this embodiment, streaming media data is buffered in real time during live broadcast of streaming media; the live broadcast is interrupted when a broadcast insertion command is received, to perform broadcast insertion until the broadcast insertion ends, and a start moment for playing the buffering is determined according to the broadcast insertion command; and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

Figure 2:
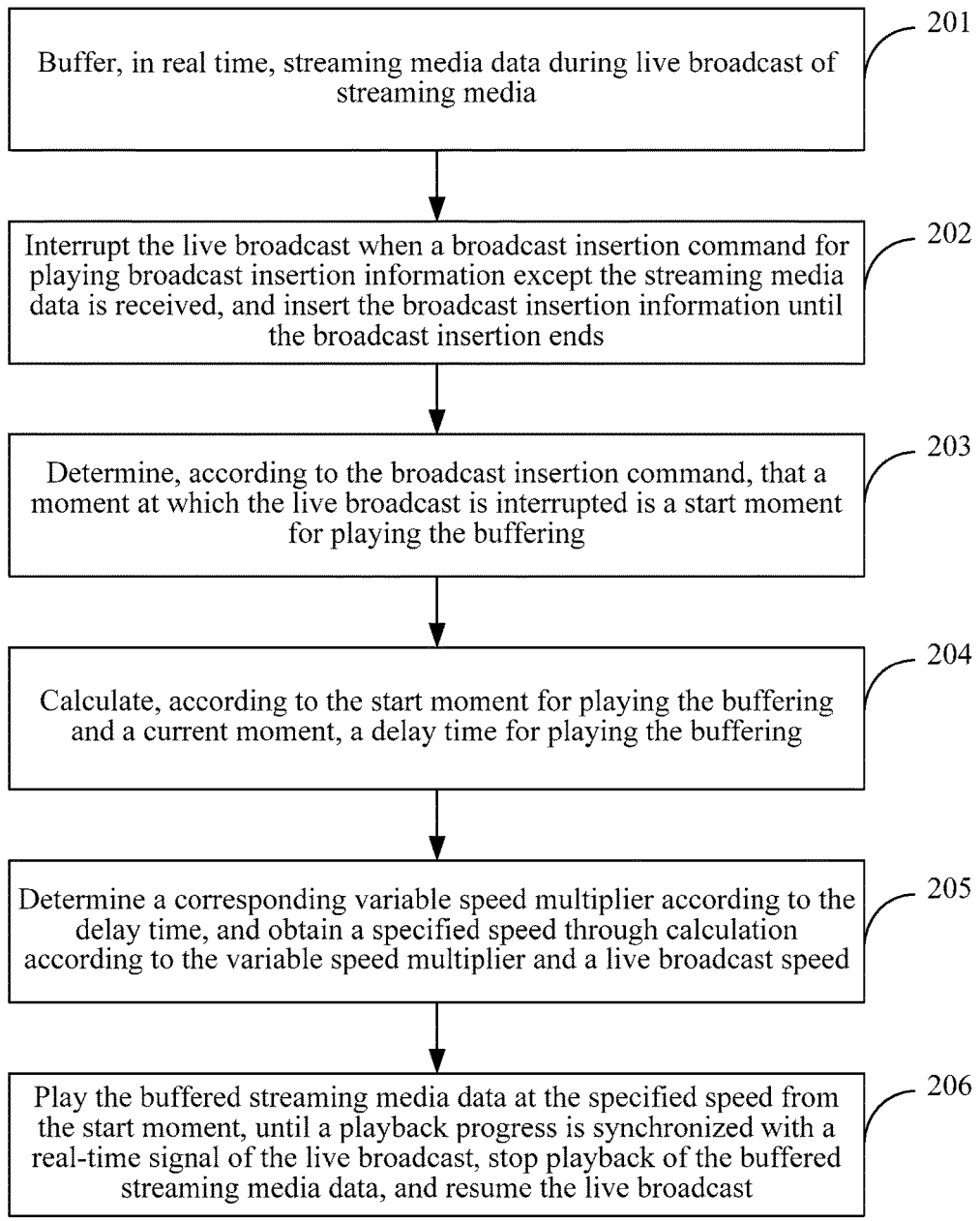
FIG. 2 is a flowchart of a method for live broadcast of streaming media according to another embodiment of the present invention.

Referring to FIG. 2, another embodiment of the present invention provides a method for live broadcast of streaming media, including:

201: Buffer, in real time, streaming media data during live broadcast of streaming media.

202: Interrupt the live broadcast when a broadcast insertion command for playing broadcast insertion information except the streaming media data is received, and insert the broadcast insertion information until the broadcast insertion ends.

The broadcast insertion command includes broadcast insertion information, and the broadcast insertion information is not the streaming media data of the live broadcast but other information except the streaming media data. The broadcast insertion information may be read from the broadcast insertion command, and after the live broadcast is interrupted, the broadcast insertion information is inserted for a user.

203: Determine, according to the broadcast insertion command, that a moment at which the live broadcast is interrupted is a start moment for playing the buffering.

In this embodiment, in order not to loss live broadcast information, it is determined that the moment at which the live broadcast is interrupted is the start moment for playing the buffering, so that it is ensured that after the broadcast insertion and when the buffered streaming media data is played, content before the broadcast insertion can be resumed for playback, thereby ensuring integrity of the live broadcast information.

204: Calculate, according to the start moment for playing the buffering and a current moment, a delay time for playing the buffering.

Specifically, the delay time may be obtained by subtracting the start moment for playing the buffering from the current moment, where the delay time indicates a delay time for the live broadcast after the broadcast insertion is completed, and the delay time may be used to determine a speed for playing the buffered streaming media data. For example, when the delay time is long, the speed for playing the buffered streaming media data may be increased, and when the delay time is short, the speed for playing the buffered streaming media data may be reduced, so as to ensure that the speed for playing the buffered streaming media data catches up with a playback speed of the live broadcast.

205: Determine a corresponding variable speed multiplier according to the delay time, and obtain a specified speed through calculation according to the variable speed multiplier and a live broadcast speed.

The variable speed multiplier is a number greater than 1; therefore, the specified speed is higher than a live broadcast speed of the streaming media.

There may be multiple manners for determining the variable speed multiplier according to the delay time. For example, a factor is set, and a delay time is multiplied by the factor to obtain a variable speed multiplier; or a mapping table is set, each delay time in the table corresponds to a fixed variable speed multiplier, and a corresponding variable speed multiplier can be obtained by looking up the table according to a delay time; certainly, an algorithm may also be preset, and a variable speed multiplier is calculated according to the algorithm; and the like, which is not specifically limited in this embodiment. After the variable speed multiplier is obtained, the variable speed multiplier may be multiplied by the live broadcast speed to obtain the specified speed, where the specified speed is used to play the buffered streaming media data.

For example, the delay time is 5 seconds, and the variable speed multiplier is determined to be 1.5 times; therefore, the buffered streaming media data is played at a speed 1.5 times of the original speed, and 10 seconds later, the playback of the buffered streaming media data can catch up with a real-time signal of the live broadcast. For another example, the delay time is 10 seconds, and the variable speed multiplier is determined to be 2.0 times; therefore, the buffered streaming media data is played at a speed 2.0 times of the original speed, and 10 seconds later, the playback of the buffered streaming media data can also catch up with the real-time signal of the live broadcast.

206: Play the buffered streaming media data at the specified speed from the start moment, until a playback process is synchronized with a real-time signal of the live broadcast, stop playback of the buffered streaming media data, and resume the live broadcast.

The method provided in this embodiment is applicable to an application scenario of automotive navigation. For example, a radio is being played in an automobile, and a real-time signal of the radio is buffered at the same time. At a moment, a navigation system needs to play prompt information, and therefore, sends a broadcast insertion command to a live broadcast system. After receiving the broadcast insertion command, the live broadcast system pauses playback of a current live broadcast signal of the radio, and inserts playback of navigation information. After the playback of the navigation information is completed, buffered data is read, and the buffered data is played at a specified speed from a moment at which the live broadcast is interrupted, until a playback process is synchronized with the real-time signal of the radio in the live broadcast; and the playback of the buffered data is stopped, and the live broadcast of the radio is resumed.

In the foregoing method provided by this embodiment, streaming media data is buffered in real time during live broadcast of streaming media; the live broadcast is interrupted when a broadcast insertion command for playing broadcast insertion information except the streaming media data is received, and the broadcast insertion information is inserted until the broadcast insertion ends, and it is determined, according to the broadcast insertion command, that a moment at which the live broadcast is interrupted is the start moment for playing the buffering; a delay time for playing the buffering is calculated according to the start moment for playing the buffering and a current moment, and a corresponding variable speed multiplier is determined according to the delay time, and the specified speed is obtained through calculation according to the variable speed multiplier and the live broadcast speed; and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

Figure 3:
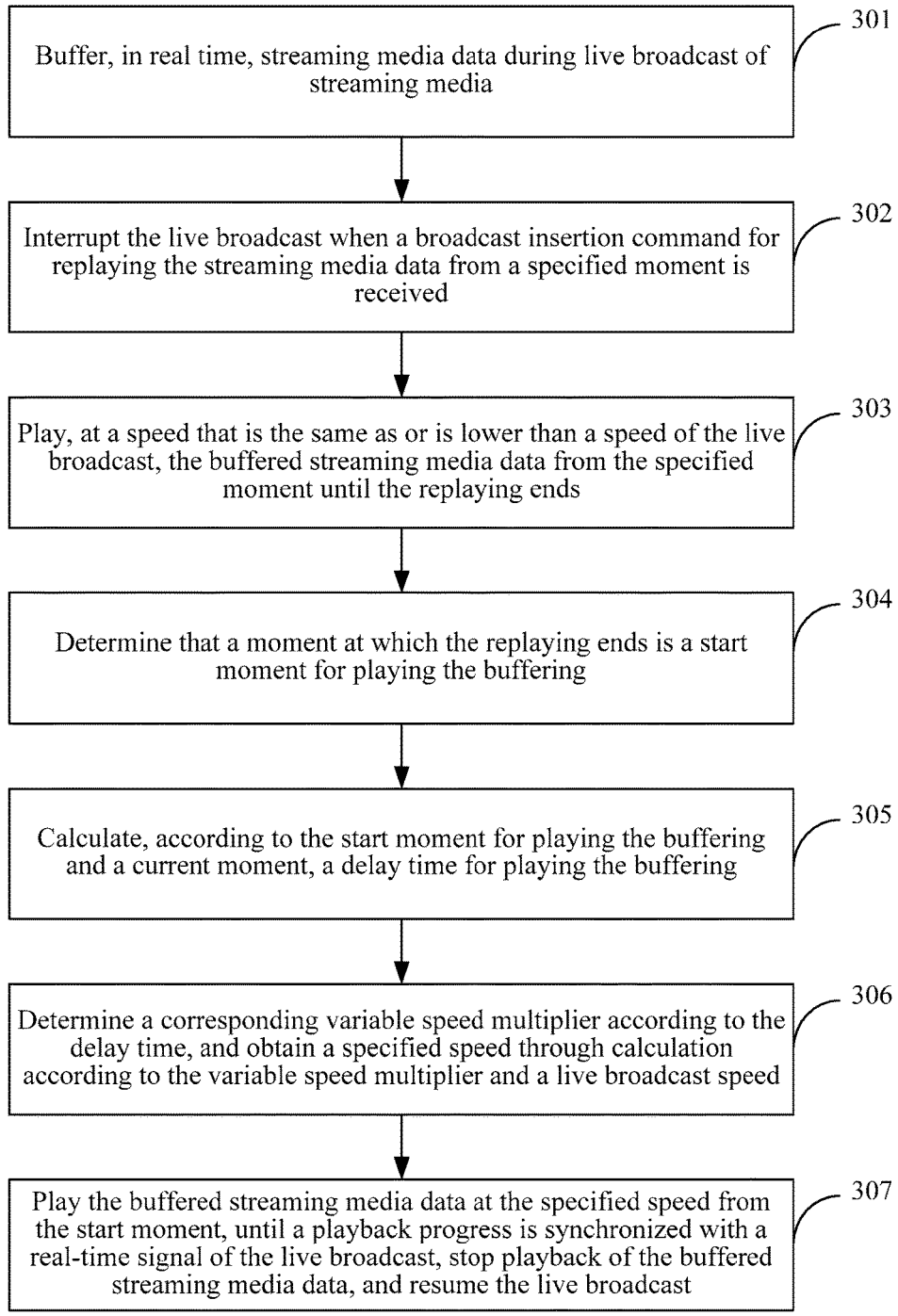
FIG. 3 is a flowchart of a method for live broadcast of streaming media according to another embodiment of the present invention.

Referring to FIG. 3, another embodiment of the present invention provides a method for live broadcast of streaming media, including:

301: Buffer, in real time, streaming media data during live broadcast of streaming media.

302: Interrupt the live broadcast when a broadcast insertion command for replaying the streaming media data from a specified moment is received.

The broadcast insertion command includes information related to the replaying, at least includes a start moment for the replaying, and may further include: duration of the replaying, a speed of the replaying, and the like, which is not specifically limited in this embodiment.

303: Play, at a speed that is the same as or is lower than a speed of the live broadcast, the buffered streaming media data from the specified moment until the replaying ends.

Generally, replayed content is important content or content of highlights, and may be replayed at a speed that is the same as the speed of the live broadcast, or may be replayed at a speed that is lower than the speed of the live broadcast, that is, low-speed playback, so that a user can view replayed content more carefully.

In this embodiment, ending of the replay may be directly specified by the broadcast insertion command; for example, duration of the replaying is specified, so that a time at which the replaying ends is determined. Alternatively, ending of the replaying may also be manually triggered by a user; for example, during replaying, a user clicks an end button to end current replaying, which is not specifically limited in this embodiment.

304: Determine that a moment at which the replaying ends is a start moment for playing the buffering.

In this embodiment, because replayed content is a part of content of the streaming media data in the live broadcast and is content before a current moment, after the replaying is completed, it can be ensured that a live broadcast signal is not lost, provided that the buffered streaming media data is resumed for playback from a moment at which the replaying ends, without a need to return to a moment at which the live broadcast is interrupted.

305: Calculate, according to the start moment for playing the buffering and a current moment, a delay time for playing the buffering.

The delay time may be obtained by subtracting the start moment for playing the buffering from the current moment.

306: Determine a corresponding variable speed multiplier according to the delay time, and obtain a specified speed through calculation according to the variable speed multiplier and a live broadcast speed.

In this embodiment, the variable speed multiplier is a number greater than 1; therefore, the specified speed is higher than a live broadcast speed of the streaming media.

307: Play the buffered streaming media data at the specified speed from the start moment, until a playback process is synchronized with a real-time signal of the live broadcast, stop playback of the buffered streaming media data, and resume the live broadcast.

The method provided in this embodiment is applicable to an application scenario of television replaying. For example, a ball game is live on television currently, and a real-time signal of the ball game is buffered at the same time. At a moment, a user clicks a replay button to trigger a broadcast insertion command; therefore, playback of a current live broadcast signal is paused, and replaying of buffered streaming media data is started. After the replaying is completed, the buffered streaming media data is resumed for playback at a specified speed from the ending moment of the replaying, until a playback process is synchronized with the real-time signal of the live broadcast, playback of the buffered streaming media data is stopped, and resume the live broadcast of the ball game.

In the foregoing method provided by this embodiment, streaming media data is buffered in real time during live broadcast of streaming media; the live broadcast is interrupted when a broadcast insertion command for replaying the streaming media data from a specified moment is received; playback of the buffered streaming media data is started at a speed that is the same as or is lower than a speed of the live broadcast and from the specified moment until the replaying ends; and it is determined that a moment at which the replaying ends is the start moment for playing the buffering; a delay time for playing the buffering is calculated according to the start moment for playing the buffering and a current moment, and a corresponding variable speed multiplier is determined according to the delay time, and the specified speed is obtained through calculation according to the variable speed multiplier and the live broadcast speed; and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

Figure 4:
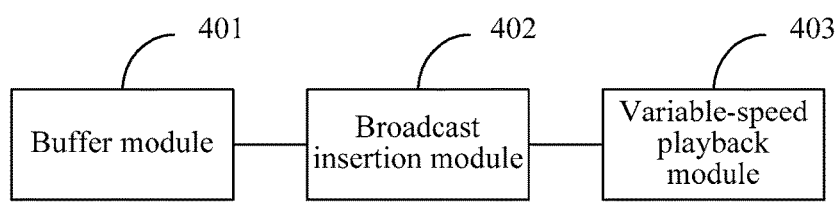
FIG. 4 is a structural diagram of an apparatus for live broadcast of streaming media according to another embodiment of the present invention.

Referring to FIG. 4, another embodiment of the present invention provides an apparatus for live broadcast of streaming media, including:

a buffer module 401, configured to buffer, in real time, streaming media data during live broadcast of streaming media;

a broadcast insertion module 402, configured to interrupt the live broadcast when a broadcast insertion command is received, to perform broadcast insertion until the broadcast insertion ends, and determine, according to the broadcast insertion command, a start moment for playing the buffering; and a variable-speed playback module 403, configured to play the buffered streaming media data at a specified speed from the start moment, until a playback process is synchronized with a real-time signal of the live broadcast, stop playback of the buffered streaming media data, and resume the live broadcast, the specified speed being higher than a live broadcast speed of the streaming media.

In this embodiment, the broadcast insertion module 402 may include:

a first broadcast insertion unit, configured to interrupt the live broadcast when a broadcast insertion command for playing broadcast insertion information except the streaming media data is received, and insert the broadcast insertion information until the broadcast insertion ends; and a first determining unit, configured to determine, according to the broadcast insertion command, that a moment at which the live broadcast is interrupted is the start moment for playing the buffering.

In this embodiment, the broadcast insertion module 402 may include:

a second broadcast insertion unit, configured to interrupt the live broadcast when a broadcast insertion command for replaying the streaming media data from a specified moment is received, and play the buffered streaming media data from the specified moment until the replaying ends; and a second determining unit, configured to determine that a moment at which the replaying ends is the start moment for playing the buffering.

Further, the foregoing second broadcast insertion unit may be configured to: play, at a speed that is the same as or is lower than a speed of the live broadcast, the buffered streaming media data from the specified moment until the replaying ends.

Figure 5:
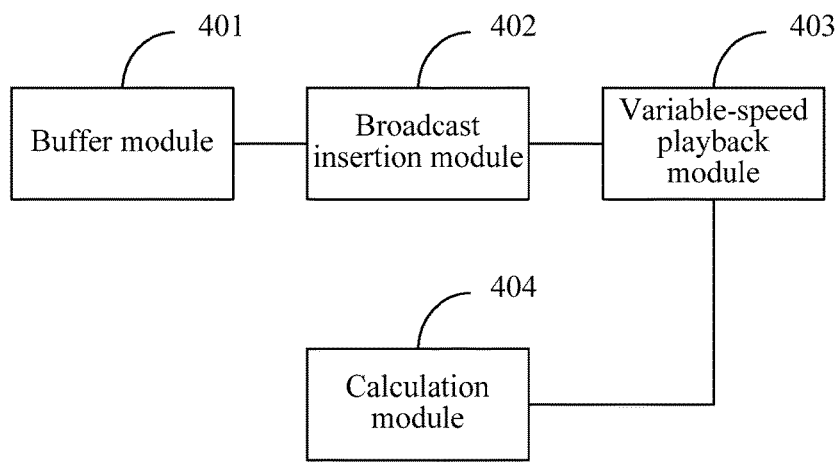
FIG. 5 is a structural diagram of an apparatus for live broadcast of streaming media according to another embodiment of the present invention.

Referring to FIG. 5, the foregoing apparatus may further include:

a calculation module 404, configured to calculate, according to the start moment for playing the buffering and a current moment, a delay time for playing the buffering; and determine a corresponding variable speed multiplier according to the delay time, and obtain the specified speed through calculation according to the variable speed multiplier and the live broadcast speed.

In the foregoing apparatus provided by this embodiment, streaming media data is buffered in real time during live broadcast of streaming media; the live broadcast is interrupted when a broadcast insertion command is received, to perform broadcast insertion until the broadcast insertion ends, and a start moment for playing the buffering is determined according to the broadcast insertion command;

and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

Figure 6:
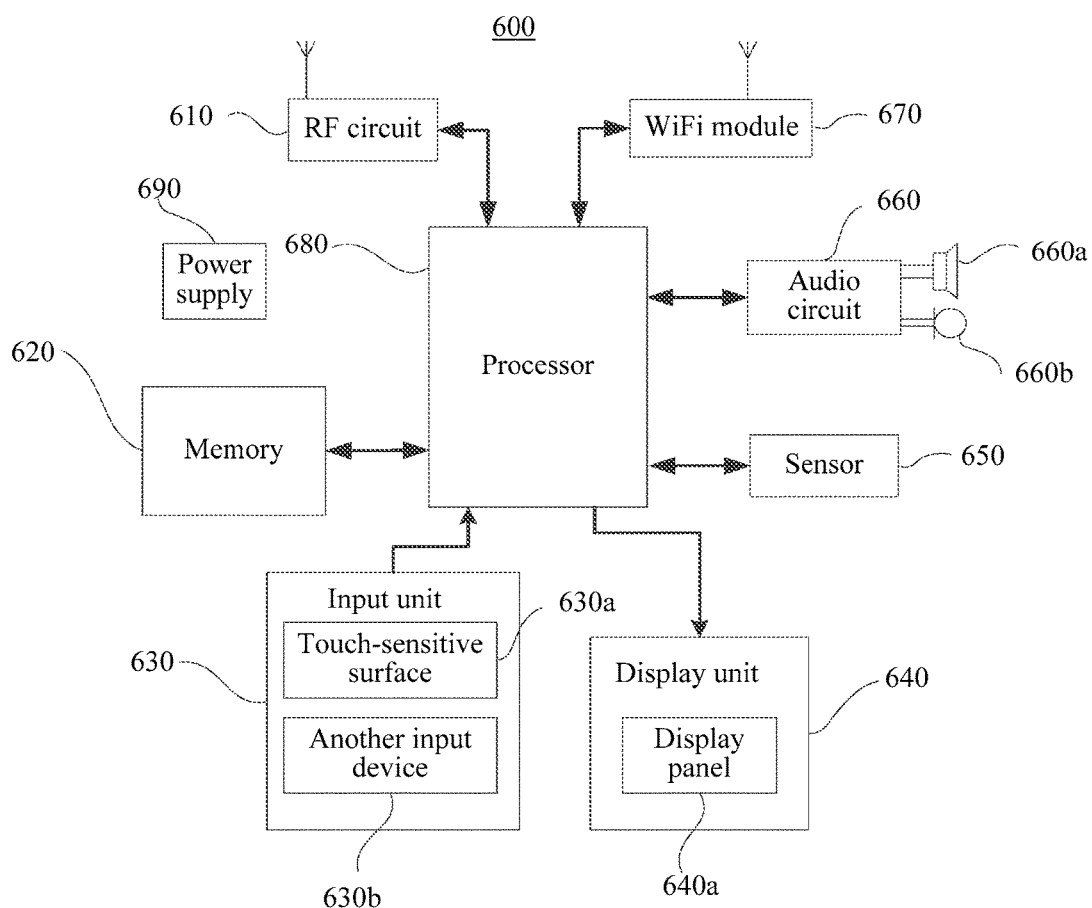
FIG. 6 is a structural diagram of a terminal according to another embodiment of the present invention.

Referring to FIG. 6, another embodiment of the present invention provides a terminal 600, which may include components such as a communications unit 610, a memory 620 including one or more non-volatile readable storage media, an input unit 630, a display unit 640, a sensor 650, an audio circuit 660, a wireless fidelity (WiFi) module 670, a processor 680 including one or more processing cores, and a power supply 690.

A person skilled in the art may understand that the structure of the terminal device shown in FIG. 6 does not constitute a limitation to the terminal device, and the terminal device may include more components or fewer components than those shown in the figure, or some components may be combined, or a different component deployment may be used.

The communications unit 610 may be configured to receive and send signals during an information receiving and sending process or a call process. The communications unit 610 may be a network communications device, such as a radio frequency (RF) circuit, a router, or a modem. Particularly, when the communications unit 610 is the RF circuit, the communications unit receives downlink information from a base station, then delivers the downlink information to one or more processor 680 for processing, and sends related uplink data to the base station. Generally, the RF circuit serving as the communications unit includes but is not limited to an antenna, at least one amplifier, a tuner, one or more oscillators, a subscriber identity module (SIM) card, a transceiver, a coupler, a low noise amplifier (LNA), and a duplexer. In addition, the RF circuit 610 may also communicate with a network and another device by wireless communication. The wireless communication may use any communications standard or protocol, which includes but is not limited to Global System for Mobile communications (GSM), a general packet radio service (GPRS), Code Division Multiple Access (CDMA), Wideband Code Division Multiple Access (WCDMA), Long Term Evolution (LTE), an e-mail, a Short Messaging Service (SMS), and the like. The memory 620 may be configured to store a software program and module. The processor 680 runs the software program and module stored in the memory 620, to implement various functional applications and data processing. The memory 620 may mainly include a program storage area and a data storage area. The program storage area may store an operating system, an application program required by at least one function (such as a sound playback function and an image display function), and the like. The data storage area may store data (such as audio data and a telephone directory) created according to use of the terminal device 600, and the like. In addition, the memory 620 may include a high speed random access memory, and may also include a non-volatile memory, such as at least one magnetic disk storage device, a flash memory, or another volatile solid-state storage device. Correspondingly, the memory 620 may further include a memory controller, so that the processor 680 and the input unit 630 access the memory 620.

The input unit 630 may be configured to receive input digit or character information, and generate a keyboard, mouse, joystick, optical, or track ball signal input related to the user setting and function control. Optionally, the input unit 630 may include a touch-sensitive surface 630a and another input device 630b. The touch-sensitive surface 630a, which may also be referred to as a touch screen or a touch panel, may collect a touch operation of a user on or near the touch-sensitive surface (such as an operation of a user on or near the touch-sensitive surface 630a by using any suitable object or accessory, such as a finger or a stylus), and drive a corresponding connection apparatus according to a preset program. Optionally, the touch-sensitive surface 630a may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 680. Moreover, the touch controller can receive and execute a command sent by the processor 680. In addition, the touch-sensitive surface 630a may be a resistive, capacitive, infrared, or surface sound wave type touch-sensitive surface. In addition to the touch-sensitive surface 630a, the input unit 630 may further include the another input device 630b. Optionally, the another input device 630b may include but is not limited to one or more of a physical keyboard, a functional key (such as a volume control key or a switch key), a track ball, a mouse, and a joystick.

The display unit 640 may be configured to display information input by the user or information provided for the user, and various graphical user interfaces of the terminal 600. The graphical user interface may be formed by a graph, a text, an icon, a video, or any combination thereof. The display unit 640 may include a display panel 640a. Optionally, the display panel 640a may be configured by using a liquid crystal display (LCD), an organic light-emitting diode (OLED), or the like. Further, the touch-sensitive surface 630a may cover the display panel 640a. After detecting a touch operation on or near the touch-sensitive surface 630a, the touch-sensitive surface 630a transfers the touch operation to the processor 680, so as to determine the type of the touch event. Then, the processor 680 provides a corresponding visual output on the display panel 640a according to the type of the touch event. Although, in FIG. 6, the touch-sensitive surface 630a and the display panel 640a are used as two separate parts to implement input and output functions, in some embodiments, the touch-sensitive surface 630a and the display panel 640a may be integrated to implement the input and output functions.

The terminal 600 may further include at least one sensor 650, such as an optical sensor, a motion sensor, and other sensors. Optionally, the optical sensor may include an ambient light sensor and a proximity sensor. The ambient light sensor can adjust luminance of the display panel 640a according to brightness of the ambient light. The proximity sensor may switch off the display panel 640a and/or backlight when the terminal 600 is moved to an ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 600, are not further described herein.

The audio circuit 660, a loudspeaker 660a, and a microphone 660b may provide audio interfaces between the user and the terminal 600. The audio circuit 660 may convert received audio data into an electric signal and transmit the electric signal to the loudspeaker 660a. The loudspeaker 660a converts the electric signal into a sound signal for output. On the other hand, the microphone 660b converts a collected sound signal into an electric signal. The audio circuit 660 receives the electric signal and converts the electric signal into audio data, and outputs the audio data to the processor 680 for processing. Subsequently, the processor 680 sends the audio data to, for example, another terminal by using the RF circuit 610, or outputs the audio data to the memory 620 for further processing. The audio circuit 660 may further include an earplug jack, so as to provide communication between a peripheral earphone and the terminal 600.

To implement wireless communication, the terminal may be configured with a wireless communications unit 670. The wireless communications unit 670 may be a WiFi module. WiFi is a short distance wireless transmission technology. The terminal 600 may help, by using the wireless communications unit 670, the user to receive and send e-mails, browse a webpage, access streaming media, and so on, which provides wireless broadband Internet access for the user. Although FIG. 6 shows the wireless communications unit 670, it may be understood that the wireless communications unit is not a necessary component of the terminal 600, and when required, the wireless communications unit may be omitted as long as the scope of the essence of the present disclosure is not changed.

The processor 680 is the control center of the terminal 600, and is connected to all parts of an entire mobile phone by using various interfaces and lines. By running or executing the software program and/or module stored in the memory 620, and invoking data stored in the memory 620, the processor 680 performs various functions and data processing of the terminal 600, thereby performing overall monitoring on the mobile phone. Optionally, the processor 680 may include one or more processing cores. Preferably, the processor 680 may integrate an application processor and a modem. The application processor mainly processes an operating system, a user interface, an application program, and the like. The modem mainly processes wireless communication. It may be understood that the foregoing modem may also not be integrated into the processor 680.

The terminal 600 further includes the power supply 690 (such as a battery) for supplying power to the components. Preferably, the power supply may be logically connected to the processor 680 by using a power management system, thereby implementing functions such as charging, discharging and power consumption management by using the power management system. The power supply 690 may further include one or more of a direct current or alternating current power supply, a re-charging system, a power failure detection circuit, a power supply converter or inverter, a power supply state indicator, and any other components.

Although not shown in the figure, the terminal 600 may further include a camera, a Bluetooth module, and the like, which are not further described herein.

The foregoing describes an optional structure of the terminal 600 with reference to FIG. 6, where one or more modules are stored in the memory and configured to be performed by the one or more processors, and the one or more modules have the following functions:

buffering, in real time, streaming media data during live broadcast of streaming media;

interrupting the live broadcast when a broadcast insertion command is received, to perform broadcast insertion until the broadcast insertion ends, and determining, according to the broadcast insertion command, a start moment for playing the buffering; and playing the buffered streaming media data at a specified speed from the start moment, until a playback process is synchronized with a real-time signal of the live broadcast, stopping playback of the buffered streaming media data, and resuming the live broadcast, the specified speed being higher than a live broadcast speed of the streaming media.

Optionally, the interrupting the live broadcast when a broadcast insertion command is received, to perform broadcast insertion until the broadcast insertion ends, and determining, according to the broadcast insertion command, a start moment for playing the buffering includes:

interrupting the live broadcast when a broadcast insertion command for playing broadcast insertion information except the streaming media data is received, and inserting the broadcast insertion information until the broadcast insertion ends; and determining, according to the broadcast insertion command, that a moment at which the live broadcast is interrupted is the start moment for playing the buffering.

Optionally, the interrupting the live broadcast when a broadcast insertion command is received, to perform broadcast insertion until the broadcast insertion ends, and determining, according to the broadcast insertion command, a start moment for playing the buffering includes:

interrupting the live broadcast when a broadcast insertion command for replaying the streaming media data from a specified moment is received, and playing the buffered streaming media data from the specified moment until the replaying ends; and determining that a moment at which the replaying ends is the start moment for playing the buffering.

Optionally, the playing the buffered streaming media data from the specified moment until the replaying ends includes:

playing, at a speed that is the same as or is lower than a speed of the live broadcast, the buffered streaming media data from the specified moment until the replaying ends.

Optionally, the one or more modules further have the following functions:

calculating, according to the start moment for playing the buffering and a current moment, a delay time for playing the buffering; and determining a corresponding variable speed multiplier according to the delay time, and obtaining the specified speed through calculation according to the variable speed multiplier and the live broadcast speed.

In the foregoing terminal provided by this embodiment, streaming media data is buffered in real time during live broadcast of streaming media; the live broadcast is interrupted when a broadcast insertion command is received, to perform broadcast insertion until the broadcast insertion ends, and a start moment for playing the buffering is determined according to the broadcast insertion command; and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

Another embodiment of the present invention provides a non-volatile readable storage medium, which stores one or more modules (programs). When the one or more modules are applied in a device, the device can perform the following instructions of steps:

buffering, in real time, streaming media data during live broadcast of streaming media;

interrupting the live broadcast when a broadcast insertion command is received, to perform broadcast insertion until the broadcast insertion ends, and determining, according to the broadcast insertion command, a start moment for playing the buffering; and playing the buffered streaming media data at a specified speed from the start moment, until a playback process is synchronized with a real-time signal of the live broadcast, stopping playback of the buffered streaming media data, and resuming the live broadcast, the specified speed being higher than a live broadcast speed of the streaming media.

Optionally, the interrupting the live broadcast when a broadcast insertion command is received, to perform broadcast insertion until the broadcast insertion ends, and determining, according to the broadcast insertion command, a start moment for playing the buffering includes:

interrupting the live broadcast when a broadcast insertion command for playing broadcast insertion information except the streaming media data is received, and inserting the broadcast insertion information until the broadcast insertion ends; and determining, according to the broadcast insertion command, that a moment at which the live broadcast is interrupted is the start moment for playing the buffering.

Optionally, the interrupting the live broadcast when a broadcast insertion command is received, to perform broadcast insertion until the broadcast insertion ends, and determining, according to the broadcast insertion command, a start moment for playing the buffering includes:

interrupting the live broadcast when a broadcast insertion command for replaying the streaming media data from a specified moment is received, and playing the buffered streaming media data from the specified moment until the replaying ends; and determining that a moment at which the replaying ends is the start moment for playing the buffering.

Optionally, the playing the buffered streaming media data from the specified moment until the replaying ends includes:

playing, at a speed that is the same as or is lower than a speed of the live broadcast, the buffered streaming media data from the specified moment until the replaying ends.

The device may further perform the following instructions of steps:

calculating, according to the start moment for playing the buffering and a current moment, a delay time for playing the buffering; and determining a corresponding variable speed multiplier according to the delay time, and obtaining the specified speed through calculation according to the variable speed multiplier and the live broadcast speed.

In the foregoing non-volatile readable storage medium provided by this embodiment, streaming media data is buffered in real time during live broadcast of streaming media; the live broadcast is interrupted when a broadcast insertion command is received, to perform broadcast insertion until the broadcast insertion ends, and a start moment for playing the buffering is determined according to the broadcast insertion command; and the buffered streaming media data is played at a specified speed from the start moment, until a playback process is synchronized with a real-time signal of the live broadcast, playback of the buffered streaming media data is stopped, and the live broadcast is resumed, where the specified speed is higher than a live broadcast speed of the streaming media; so that after the broadcast insertion, the buffered streaming media data is rapidly played until synchronized with the live broadcast, which not only ensures that no live broadcast information is lost, but also can resume the live broadcast as rapidly as possible, thereby reducing impact on the live broadcast, and improving user experience.

A person of ordinary skilled in the art may understand that all or some of the steps of the foregoing embodiments may be implemented by using hardware, or may be implemented by a program instructing relevant hardware. The program may be stored in a non-volatile readable storage medium. The non-volatile readable storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for interrupting and resuming live broadcast of streaming media at a terminal device having one or more processors and memory storing one or more programs to be executed by the one or more processors, the method comprising:

buffering, in real time, streaming media data during the live broadcast of the streaming media, wherein the live broadcast is broadcast at a first speed;

receiving a broadcast insertion command;

in response to the broadcast insertion command:
    interrupting the live broadcast;
    playing broadcast insertion information associated with the broadcast insertion command; and
    determining, according to (i) the broadcast insertion command, (ii) the first speed, and (iii) a current moment, a buffer play start moment for playing the buffered streaming media data; and after playing the broadcast insertion information associated with the broadcast insertion command and without any user input:
    playing the buffered streaming media data at a second speed from the buffer play start moment, the second speed being greater than the first speed, wherein a difference between the first speed and the second speed is based on a play time of the broadcast insertion information.

2. The method according to claim 1, further comprising:
upon determining that a playback process of the buffered streaming media data is synchronized with the live broadcast of the streaming media:

stopping the playback process of the buffered streaming media data; and resuming the live broadcast of the streaming media, wherein the resumed live broadcast is broadcast at the first speed.

3. The method according to claim 1, further comprising:

calculating, according to the buffer play start moment and the current moment, the play time of the broadcast insertion information; and determining the second speed as a function of the first speed of the live broadcast, the play time, and a future moment at which the playing of the buffered streaming media data is synchronized with the live broadcast of the streaming media.

4. The method according to claim 3, further comprising:

mapping the play time to a corresponding variable speed multiplier in a look-up table including a plurality of variable speed multipliers; and determining the second speed by multiplying the first speed by the corresponding variable speed multiplier.

5. The method according to claim 1, wherein the buffer play start moment for playing the buffered streaming media data is determined to be a moment at which the live broadcast is interrupted.

6. The method according to claim 1, wherein the broadcast insertion command includes a buffer replay start moment and the broadcast insertion information is the buffered streaming media data from the buffer replay start moment and the buffer play start moment for playing the buffered streaming media data is determined to be a moment at which the replay of the buffered streaming media data from the buffer replay start moment ends.

7. A terminal device for interrupting and resuming live broadcast of streaming media, the terminal device comprising:

one or more processors;

memory; and a plurality of program modules stored in the memory and to be executed by the one or more processors, the plurality of program modules further comprising instructions for:

buffering, in real time, streaming media data during the live broadcast of the streaming media, wherein the live broadcast is broadcast at a first speed;

receiving a broadcast insertion command;

in response to the broadcast insertion command:

interrupting the live broadcast;

playing broadcast insertion information associated with the broadcast insertion command; and determining, according to (i) the broadcast insertion command, (ii) the first speed, and (iii) a current moment, a buffer play start moment for playing the buffered streaming media data; and after playing the broadcast insertion information associated with the broadcast insertion command and without any user input:

playing the buffered streaming media data at a second speed from the buffer play start moment, the second speed being greater than the first speed, wherein a difference between the first speed and the second speed is based on a play time of the broadcast insertion information.

8. The terminal device according to claim 7, wherein the plurality of program modules further comprise instructions for:

upon determining that a playback process of the buffered streaming media data is synchronized with the live broadcast of the streaming media:

stopping the playback process of the buffered streaming media data; and resuming the live broadcast of the streaming media, wherein the resumed live broadcast is broadcast at the first speed.

9. The terminal device according to claim 7, wherein the plurality of program modules further comprise instructions for:

calculating, according to the buffer play start moment and the current moment, the play time of the broadcast insertion information; and determining the second speed as a function of the first speed of the live broadcast, the play time, and a future moment at which the playing of the buffered streaming media data is synchronized with the live broadcast of the streaming media.

10. The terminal device according to claim 9, wherein the plurality of program modules further comprise instructions for:

mapping the play time to a corresponding variable speed multiplier in a look-up table including a plurality of variable speed multipliers; and determining the second speed by multiplying the first speed by the corresponding variable speed multiplier.

11. The terminal device according to claim 7, wherein the buffer play start moment for playing the buffered streaming media data is determined to be a moment at which the live broadcast is interrupted.

12. The terminal device according to claim 7, wherein the broadcast insertion command includes a buffer replay start moment and the broadcast insertion information is the buffered streaming media data from the buffer replay start moment and the buffer play start moment for playing the buffered streaming media data is determined to be a moment at which the replay of the buffered streaming media data from the buffer replay start moment ends.

13. A non-transitory computer storage medium comprising a plurality of computer executable instructions, the computer executable instructions being executed by one or more processors of a terminal device for interrupting and resuming live broadcast of streaming media, the computer executable instructions comprising:

buffering, in real time, streaming media data during the live broadcast of the streaming media, wherein the live broadcast is broadcast at a first speed;

receiving a broadcast insertion command;

in response to the broadcast insertion command:

interrupting the live broadcast;

playing broadcast insertion information associated with the broadcast insertion command; and determining, according to (i) the broadcast insertion command, (ii) the first speed, and (iii) a current moment, a buffer play start moment for playing the buffered streaming media data; and after playing the broadcast insertion information associated with the broadcast insertion command and without any user input:

playing the buffered streaming media data at a second speed from the buffer play start moment, the second speed being greater than the first speed, wherein a difference between the first speed and the second speed is based on a play time of the broadcast insertion information.

14. The non-transitory computer storage medium according to claim 13, wherein the plurality of program modules further comprise instructions for:
 upon determining that a playback process of the buffered streaming media data is synchronized with the live broadcast of the streaming media:
  stopping the playback process of the buffered streaming media data; and
  resuming the live broadcast of the streaming media, wherein the resumed live broadcast is broadcast at the first speed.

15. The non-transitory computer storage medium according to claim 13, wherein the plurality of program modules further comprise instructions for:
 calculating, according to the buffer play start moment and the current moment, the play time of the broadcast insertion information; and
 determining the second speed as a function of the first speed of the live broadcast, the play time, and a future moment at which the playing of the buffered streaming media data is synchronized with the live broadcast of the streaming media.

16. The non-transitory computer storage medium according to claim 15, wherein the plurality of program modules further comprise instructions for:
 mapping the play time to a corresponding variable speed multiplier in a look-up table including a plurality of variable speed multipliers; and
 determining the second speed by multiplying the first speed by the corresponding variable speed multiplier.

17. The non-transitory computer storage medium according to claim 13, wherein the buffer play start moment for playing the buffered streaming media data is determined to be a moment at which the live broadcast is interrupted.

18. The non-transitory computer storage medium according to claim 13, wherein the broadcast insertion command includes a buffer replay start moment and the broadcast insertion information is the buffered streaming media data from the buffer replay start moment and the buffer play start moment for playing the buffered streaming media data is determined to be a moment at which the replay of the buffered streaming media data from the buffer replay start moment ends.

* * * * *